3,082,264
ORGANOMETALLIC COMPOUNDS
Robert C. West, Jr., Madison, Wis., and William Howard Glaze, Houston, Tex., assignors to Wisconsin Alumni Research Foundation, Madison, Wis., a corporation of Wisconsin
No Drawing. Filed Aug. 28, 1961, Ser. No. 134,088
5 Claims. (Cl. 260—665)

This invention relates to organometallic compounds.

More particularly, this invention relates to alkyllithium compounds.

Still more particularly, this invention relates to alkyllithium compounds in the form of complexes.

Alkyllithium compounds of the general formula RLi, where R represents an organic group, are well known. Examples of such compounds are ethyllithium, $C_2H_5Li$ and n-butyllithium, $C_4H_9Li$. Compounds of this type have many important applications in the preparation of fine chemicals and pharmaceutical materials and as catalysts for the preparation of diolefins but are also identified with many disadvantages. Because of their great reactivity, e.g. they are spontaneously inflammable and take fire instantly when exposed to air, they usually had to be prepared immediately before use. If it was intended that they not be used immediately and had to be stored or shipped, they usually had to be kept as dilute solutions in hydrocarbon solvents and even then handled with caution.

It is an object of this invention to overcome the disadvantages associated with prior known alkyllithium compounds.

It is a further object of this invention to provide alkyllithium compounds which are stable when exposed to the atmosphere and are, therefore, characterized by a greater degree of safety where handling and storage is required.

It is a still further object of this invention to provide alkyllithium compounds which are essentially denatured in that their reactivity is substantially reduced, but which can be readily regenerated into a more reactive form. Other objects and advantages will be apparent from the following detailed description.

It has been found that the foregoing objects can be accomplished by providing organolithium complexes of the general formula LiR·LiX where R is selected from the group consisting of the cyclohexyl radical and alkyl radicals having from 2 to 18 carbon atoms and X is iodine or bromine.

Organometallic complexes of the foregoing type can be readily prepared by reacting an alkyllithium compound with an alkyl halide. The alkyllithium compound is normally used in excess of the stoichiometric amount needed to react with the lithium halide and it has been found that the greater the excess of alkyllithium compound present during the reaction, the greater the amount of complex which will be formed. The reaction is normally carried out in a hydrocarbon solvent, under an inert atmosphere, and at room temperature. Formation of the desired complex is evidenced by the presence of a precipitate in the reacting solution. This precipitate is removed by filtration, is washed wtih a dry hydrocarbon solvent and is then vacuum dried. The reaction can be carried out under other conditions, such as for example, temperatures in excess of room temperature, provided the temperature is commensurate with the formation of the desired complex and safety practices dictated by the great reactivity of the reacting chemicals. (A more detailed discussion of the alkyllithium-lithium halide complexes of this invention, including the probable theoretical aspects thereof, can be found in the thesis of William Howard Glaze entitled "Lithium Isotope Effects on the Physical and Chemical Properties of Lithium Alkyls," pages 105 et seq., available in the Libraries of the University of Wisconsin.)

The solid alkyllithium complexes of this invention can be considered, in a sense, to be denatured alkyllithium compounds. They exhibit excellent stability upon exposure to the atmosphere and can be readily stored and handled without first being put into the form of a dilute hydrocarbon solution as was required with prior known alkyllithium compounds. They do not exhibit the characteristic reaction with Michler's Ketone (p-p-dimethylaminobenzophenone) exhibited by known alkyllithium compounds (the Gilman test). Yet, they can be readily regenerated into the very reactive alkyllithium compounds merely by addition of an ether, such as, for example, diethyl ether, to the complex. The ether apparently destroys the complex and liberates the highly reactive alkyllithium compound as an ether solution. The ether-treated (regenerated) complex exhibits the Michler Ketone reaction characteristic of the known alkyllithium compounds.

The following examples are given by way of illustration only and are not be construed in any way to restrict the scope of this invention which is defined by the appended claims.

Example 1

1.8 parts of dry pure butyl bromide was added to 45 parts of a 0.79 M solution of n-butyllithium in hexane under a nitrogen atmosphere. The resulting solution was left quiescent in a dry box at room temperature for about 10 hours after which time a precipitate was present in the solution. The precipitate was removed by filtering the solution through a medium sintered glass disc under nitrogen pressure. The solid remaining on the filter was washed with 20 ml. of dry pentane and dried under vacuum for two hours.

Upon analysis the solid was found to be the complex $LiC_4H_9 \cdot LiBr$.

In the following examples the reaction to form the complex was carried out in accordance with the procedure of example 1 and with the concentrations of reactants indicated in the table below.

| Example | Reactants and Concentration (moles/liter) | | Solvent | Time (Hours) | Complex |
|---|---|---|---|---|---|
| | Alkyllithium | Alkyl Halide | | | |
| 2 | But* Li 0.45 | But Br. 0.14 | Hexane | 14 | Li But·LiBr |
| 3 | But Li 1.2 | But Br. 0.31 | Pentane | 8 | Li But·LiBr |
| 4 | Et Li 0.83 | Et** Br. 0.4 | Benzene | 4 | Li Et·LiBr |
| 5 | But Li 1.53 | But Br. 0.35 | Heptane-benzene. | 4 | Li But·LiBr |
| 6 | But Li 1.1 | But I. 0.5 | Pentane | 15 | Li But·LiI |

(*)=butyl.
(**)=ethyl.

It is to be understood that alkyllithium and alkyl halide compounds other than those set forth in the foregoing Examples can be reacted in accordance with the procedure set forth herein with comparable results in terms of formation of the desired complexes. For example, dodecyl bromide can be reacted with an excess of dodecyl lithium under the described conditions to form the complex $LiC_{12}H_{25} \cdot LiBr$.

The alkyllithium-lithium halide complexes of this invention find ready application as laboratory chemicals for use in research in that they can be stored for long periods and then easily regenerated into the more reactive alkyllithium compounds as pointed out above. Also, because of the safety with which the complexes can be handled and stored they will find ready application as industrial chemicals for chemical syntheses. The complexes find further application as catalysts for the polymerization for olefins and diolefins and because of their solid form would be particularly suitable for gas-phase polymerization.

Having thus described the invention what is claimed is:

1. Organometallic complexes of the general formula $$LiR \cdot LiX$$

where R is selected from the group consisting of the cyclohexyl radical and alkyl radicals having from 2 to 18 carbon atoms and X is selected from the group consisting of iodine and bromine.

2. The organometallic complex $$LiC_4H_9 \cdot LiBr$$

3. The organometallic complex $$LiC_4H_9 \cdot LiI$$

4. The organometallic complex $$LiC_2H_5 \cdot LiBr$$

5. A method for preparing organometallic complexes of the general formula $$LiR \cdot LiX$$

which comprises contacting an organo-halide of the formula RX, with an organo-lithium of the formula RLi where R is selected from the group consisting of cyclohexyl and alkyl radicals having from 2 to 18 carbon atoms and X is selected from the group consisting of iodine and bromine, in a hydrocarbon solvent for a time sufficient to form a precipitate, removing the precipitate by filtration, washing the precipitate with a hydrocarbon solvent and drying the washed precipitate.

References Cited in the file of this patent

Coates: "Organometallic Compounds," Wiley & Sons, New York, 2nd ed., 1960, pages 1–42.

"Metal-Organic Compounds," Number 23 of the Advances in Chemistry Series, American Chemical Society, Washington, D.C., 1959, pages 46–57.